United States Patent
Fu et al.

(10) Patent No.: US 8,653,180 B2
(45) Date of Patent: *Feb. 18, 2014

(54) AQUEOUS COMPOSITIONS COMPRISING A BLEND OF EMULSION VINYL COPOLYMER AND POLYURETHANE DISPERSION

(75) Inventors: Zhenwen Fu, Lansdale, PA (US); Andrew Hejl, North Wales, PA (US); Aurelia C. Sheppard, Newtown, PA (US); Andrew J. Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/455,766

(22) Filed: Jun. 5, 2009

(65) Prior Publication Data

US 2009/0318596 A1    Dec. 24, 2009

Related U.S. Application Data

(60) Provisional application No. 61/200,828, filed on Dec. 4, 2008, provisional application No. 61/131,694, filed on Jun. 11, 2008.

(51) Int. Cl.

| C08F 8/30 | (2006.01) |
| C08F 283/04 | (2006.01) |
| C08G 18/08 | (2006.01) |
| C08L 75/00 | (2006.01) |

(52) U.S. Cl.
USPC .......................... 524/507; 525/123; 525/455

(58) Field of Classification Search
USPC ................................. 524/507; 525/123, 455
See application file for complete search history.

(56) References Cited

U.S. PATENT DOCUMENTS

| 4,954,559 A | * | 9/1990 | Den Hartog et al. | ......... 524/507 |
| 5,541,251 A | | 7/1996 | Bontinck et al. | |
| 5,922,410 A | | 7/1999 | Swartz et al. | |
| 6,174,960 B1 | * | 1/2001 | Phan et al. | ..................... 525/191 |
| 6,566,438 B1 | | 5/2003 | Ingrisch et al. | |
| 6,607,788 B1 | | 8/2003 | Wegner et al. | |
| 7,919,556 B2 | * | 4/2011 | Koziski et al. | ................ 524/507 |
| 2006/0148980 A1 | | 7/2006 | Tielemans et al. | |
| 2006/0183839 A1 | | 8/2006 | Lau | |

FOREIGN PATENT DOCUMENTS

| EP | 332326 A2 | 9/1989 |
| EP | 1 193298 B1 | 4/2002 |
| GB | 2 298427 A | 9/1996 |
| JP | H6-329985 | 11/1994 |
| WO | WO 92/17546 A1 | 10/1992 |
| WO | WO 2005/005504 A1 | 1/2005 |
| WO | 2005/023947 A1 | 3/2005 |

* cited by examiner

*Primary Examiner* — Patrick Niland
(74) *Attorney, Agent, or Firm* — Reid S. Willis

(57) ABSTRACT

The present invention provides compositions that enable excellent early hardness development in coating applications, the compositions comprising a blend of one or more copolymer, pA, having a Tg of 20° C. or higher, and one or more polyurethane copolymer in aqueous dispersion, pB, together with one or more additive chosen from a coalescent having a normal boiling point of from 150° C. to no greater than 300° C., a naturally derived plasticizer, and mixtures thereof. The polyurethane copolymer comprises at least 40 wt. %, based on the weight of polyurethane solids, of: (i) a first polyol having a molecular weight of at least 850, wherein the first polyol is a polyether polyol, or (ii) a second polyol chosen from a polyester, a polycaprolactam, a polycarbonate and a combination thereof, wherein the second polyol has a molecular weight of at least 1,500, or (iii) a combination of one or more first polyol and one or more second polyol. The compositions may be ambient curable.

8 Claims, No Drawings

AQUEOUS COMPOSITIONS COMPRISING A BLEND OF EMULSION VINYL COPOLYMER AND POLYURETHANE DISPERSION

This application claims the benefit of priority under 35 U.S.C. § 119(e) of U.S. provisional patent application Ser. No. 61/200,828, filed on Dec. 4, 2008, and also U.S. provisional patent application Ser. No. 61/131,694, filed on Jun. 11, 2008.

The present invention relates to aqueous compositions comprising a blend of one or more emulsion vinyl copolymer with one or more polyurethane copolymer in aqueous dispersion, in particular to aqueous compositions comprising a blend of one or more hard acrylic emulsion copolymer having a Tg greater than 20° C., and one or more soft polyurethane copolymer in aqueous dispersion, together with one or more coalescent having a normal boiling point of 300° C. or less, that are suitable for use in protective coatings, having a low level of volatile organic compounds (VOCs). The soft polyurethane copolymer comprises at least 40 wt. %, based on the weight of polyurethane solids, of: (i) a first polyol having a molecular weight of at least 850, wherein the first polyol is a polyether polyol, or (ii) a second polyol chosen from a polyester, a polycaprolactam, a polycarbonate and a combination thereof, wherein the second polyol has a molecular weight of at least 1,500, or (iii) a combination of one or more first polyol and one or more second polyol.

Increasingly stringent policies and regulations for the protection of the environment have led to increased demand for protective coatings having a low VOC content. Aqueous coating compositions having low VOCs also provide reduced odor and toxicity. In order to function in a protective capacity, many types of coatings require some minimum hardness, which is predominantly controlled by the binder polymer. However, hard polymers dispersed in water usually, upon evaporation of the aqueous phase, fail to interdiffuse, remaining instead as essentially discrete polymer particles. The resulting coating is brittle and lacks film integrity or toughness.

Conventional low VOC coating compositions comprise organic polymer binders, such as those formed from the free-radical polymerization of ethylenically unsaturated monomers, include polymers having glass transition temperatures (Tg) close to or below ambient application conditions, and optionally coalescing solvents to effectively reduce the minimum film formation temperature of the coating composition. However, this approach produces coatings having inferior hardness properties, poor blocking resistance, poor soil resistance, and surface tack. Another common approach combines polymers with Tgs well above application conditions with a nonvolatile or partially nonvolatile coalescent to lower the overall film forming temperature of the binder. Such coalescents may be added as separate ingredients, and they may comprise a polymer. However, this approach results in inadequate early toughness development, and in failing to develop desirable hardness in a reasonable timeframe, if at all without baking. This is because under ambient conditions the coalescent fails to leave the film in an appropriate timeframe, for example 1-30 days. So, hardness development is lacking, particularly early hardness development.

Early hardness development is an important property in many end-uses, for example in applications requiring good early blocking resistance to avoid sticking of contacted painted surfaces, such as painted window frames contacting painted window casings, or where the coated articles need to be stacked for storage or transportation.

United States Patent Application Publication Number US 2006/0148980 A1, to Tielemans et al., discloses a hybrid polymer dispersion comprising a functionalized polyurethane polymer and a functionalized vinyl polymer either as individual particles or as composite particles wherein the polyurethane polymer is prepared in a high boiling point oxygenated coalescing solvent having no functional group reactive with isocyanates and that will remain after water dispersion.

There remains a need for compositions suitable for use in coatings having a low level of VOCs, and which provide good ambient temperature film formation while at the same time providing a superior level of hardness, early hardness development, blocking resistance, and soil resistance, and with a low surface tack. The present inventors have endeavored to meet this remaining need.

Accordingly, the present invention provides compositions that achieve in use early development of toughness and hardness, the compositions comprising aqueous blends of one or more hard copolymer (pA) with one or more soft polyurethane copolymer (pB), together with one or more coalescent having a normal boiling point of 300° C. or less. The hard copolymer may be selected from either a copolymer having as copolymerized units one or more acrylic or vinyl monomer, or a hard polyurethane copolymer in aqueous dispersion, or a vinyl-urethane hybrid copolymer in aqueous dispersion. An acrylic or vinyl copolymer is preferred.

STATEMENT OF THE INVENTION

The present invention provides an aqueous composition comprising: a) a plurality of polymer particles (A) comprising one or more copolymer, pA, having a glass transition temperature, Tg, of 20° C. or higher, as measured by differential scanning calorimetry, DSC; b) a plurality of polymer particles (B) in aqueous dispersion comprising one or more polyurethane copolymer, pB, comprising at least 40 wt. %, based on the weight of polyurethane solids, of: (i) a first polyol having a molecular weight of at least 850, wherein the first polyol is a polyether polyol, or (ii) a second polyol chosen from a polyester, a polycaprolactam, a polycarbonate and a combination thereof, wherein the second polyol has a molecular weight of at least 1,500, or (iii) a combination of one or more first polyol and one or more second polyol; and c) one or more additive to improve film formation chosen from: a coalescent having a normal boiling point of from 150° C. to no greater than 300° C. present in an amount of at least 4%, based on the total weight of solids of the copolymers pA and pB, a naturally derived plasticizer present in an amount of at least 0.5%, based on the total weight of solids of the copolymers pA and pB, and mixtures thereof; wherein the weight ratio of the copolymer solids of pA to the copolymer solids of pB is from 50/50 to 90/10. In a preferred embodiment, the composition, when dried under ambient conditions, forms a film upon evaporation of water. In another preferred embodiment, the polymer particles B form a continuous pathway or phase through the film.

In one embodiment, the copolymer pA is an acrylic copolymer, or styrene-acrylic copolymer, or a vinyl-acrylic copolymer. In one such embodiment, the copolymer pA comprises, as polymerized units, one or more auto-oxidizable group chosen from an acetoacetoxy group.

In another embodiment, the copolymer pA is a polyurethane copolymer or a vinyl-urethane hybrid.

In yet another embodiment, the copolymer, pB, has a glass transition temperature, Tg, as measured by differential scanning calorimetry, DSC, at least 15° C. lower than the Tg of pA.

In one aspect of the invention, the second polyol is a polyester polyol comprising a natural oil polyol derived from renewable feedstock resources chosen from natural plant vegetable seed oils, modified plant vegetable seed oils, animal source fats, mixtures thereof and combinations thereof.

The coalescent of the present invention may be chosen from diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof. The amount of the coalescent may range from 4.0 wt. % to 30 wt. %, based on the total weight of solids of the copolymers pA and pB.

Alternatively, or in addition to the one or more coalescent, the compositions may comprise one or more naturally derived plasticizer chosen from animal-derived oil, fish-derived oil, plant-derived oil, alkyl esters thereof, glycerides thereof, and mixtures thereof. The amount of such plasticizer is at least 0.5 wt. %, and may range from 0.5 wt. % to 20 wt. %, based on the total weight of solids of the copolymers pA and pB, preferably 10 wt. % or less.

In a further embodiment, the present invention provides aqueous coating compositions comprising the inventive aqueous compositions and coatings made from the aqueous coating compositions. Thus, aqueous coatings made from the inventive compositions, and coated substrates are provided.

In still further another embodiment, the invention also provides aqueous coating compositions comprising the inventive aqueous compositions and coatings made from the aqueous coating compositions, wherein the copolymer pA has a Tg greater than or equal to the drying temperature of the coating, and further wherein the Tg of the copolymer pB is at least 15° C. below the drying temperature of the coating.

Another embodiment of the invention provides aqueous compositions which, upon evaporation of the aqueous phase, produce a coating on a substrate, which coating exhibits hardness of at least 50 seconds as measured within 14 days after coating the substrate, wherein the coating hardness is determined by the König pendulum hardness test, and wherein the coated substrate is maintained at ambient conditions for the duration of the 14 days.

Unless otherwise indicated, conditions of temperature and pressure are room temperature and standard pressure, also referred to herein as "ambient conditions". The coatings may be dried under conditions other than ambient conditions.

Unless otherwise indicated, any term containing parentheses refers, alternatively, to the whole term as if no parentheses were present and the term without that contained in the parentheses, and combinations of each alternative. Thus, the term "(meth)acrylate" means acrylate, methacrylate, or mixtures thereof, and, similarly, the term "(meth)acrylic" refers to any of acrylic, methacrylic, and mixtures thereof.

As used herein, the term "polymer" includes the term "copolymer", and, unless otherwise indicated, the term "copolymer" refers to polymers made from any two or more different monomers, e.g. terpolymers, pentapolymers etc., and homopolymers functionalized after polymerization so that two or more different functional groups are present in the product copolymer.

As used herein, unless otherwise indicated, the term "emulsion polymer" refers to a polymer made by emulsion polymerization.

As used herein, the term "naturally derived plasticizer" refers to animal-derived oil, fish-derived oil, plant-derived oil, alkyl esters thereof, glycerides thereof, and mixtures thereof.

As used herein, the term "acid monomer or anionic monomer" means ethylenically unsaturated carboxylic acid monomer in either the acid or anionic form.

As used herein, the term "ethylenically unsaturated carboxylic acid monomer" refers to acrylic acid, methacrylic acid, beta-acryloxypropionic acid, ethacrylic acid, a-chloroacrylic acid, a-vinylacrylic acid, crotonic acid, a-phenylacrylic acid, cinnamic acid, chlorocinnamic acid, β-styrylacrylic acid, maleic acid, itaconic acid, citraconic acid, and salts thereof.

As used in the claims and elsewhere herein, unless otherwise indicated, the phrase "glass transition temperature" or "Tg" refers to a measured Tg, determined by differential scanning calorimetry (DSC) using a heating rate of 10° C./minute, taking the mid-point in the heat flow versus temperature transition as the Tg value.

As used herein, unless otherwise indicated, the term "molecular weight" refers to the weight average molecular weight of a (co)polymer as measured by gel permeation chromatography (GPC), as calibrated with a polystyrene standard. Gel permeation chromatography separates the members of a distribution of polymer chains according to their hydrodynamic size in solution rather than their molar mass. The system is then calibrated with standards of known molecular weight and composition to correlate elution time with molecular weight. The term "Mn" refers to the number average molecular weight of a (co)polymer as determined by GPC, as calibrated with a polystyrene standard. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84. Molecular weights herein are in units of Daltons.

As used herein, unless otherwise indicated, the term "normal boiling point" refers to the boiling point of a liquid at 760 mm/Hg.

The singular forms "a," "an," and "the" include plural referents unless the context clearly dictates otherwise. The endpoints of all ranges directed to the same component or property are inclusive of the endpoint and independently combinable.

The present invention utilizes the addition of a soft polyurethane copolymer as a minority phase (for example, 10% to 50%, preferably 10% to 45%) within a majority (50-90%, preferably 55-90%) hard acrylic or vinyl copolymer phase and produces films that possess much better early hardness development than films of the hard copolymer alone. This outcome is counterintuitive because, for example, blending two copolymers would be expected to produce, for a given property, a value for that property of the product that is intermediate between the two values for the respective constituent copolymers, although not necessarily a straight weighted average of the two values for the respective component copolymers according to the blend ratio. The result also runs contrary to logic because one would expect the addition of a softer component copolymer to a hard copolymer to produce a film that is softer than that resulting from the hard copolymer alone.

Without wishing to be bound by theory, it is believed that in films of hard copolymers alone, the addition of the soft polyurethane provides a pathway for the coalescent to escape and therefore allows the majority hard phase copolymer film to attain its theoretical maximum hardness. The lower the normal boiling point of the coalescent, the easier it is for the coalescent to diffuse and evaporate out of the film. Accordingly, to attain maximum hardness and early hardness development, the polymer film coating comprises a majority hard polymer (Tg, >20° C.) component to provide a maximum hardness attainable, a coalescent of normal boiling point <300° C. to aid in film formation of the hard phase, and a minority soft polyurethane copolymer component to provide a facile diffusion pathway for the coalescent. Preferably, the soft polymer phase produced by the soft PUD particles provides a continuous pathway through the film in order to facilitate diffusion of the coalescent through the polymer film.

In one embodiment, a naturally derived plasticizer is used instead of or in addition to the coalescent, e.g. an animal- or fish- or plant-derived oil, or alkyl ester thereof, or glyceride thereof, and acts as either a penetrant (and moves into the substrate, such as wood or cement) or a reactive species (for example by an autoxidation process, the sites of unsaturation of the oil providing oxidative crosslinking sites within the film) as opposed to off-gassing into the air. Oils useful in this embodiment of the invention are described in United States Patent Application Publication Numbers US2004/0039095 (to Van de Mark, et al., see, for example, paragraphs [0040] to [0051]) and US2007/0101902 (to Frees, et al.; see, for example, paragraphs [0014] to [0016]). Suitable amounts of the plasticizer may be 0.5 wt. % or more, or, preferably, 2 wt. % or more, or 5 wt. % or more, based on the total weight of solids of the copolymers in the blend, and may range up to 30 wt. %, or, preferably, less than 20 wt. %, or less than 10 wt. %.

The vinyl copolymers may be prepared from a wide range of polymerizable ethylenically unsaturated monomers, such as, for example, nonionic ethylenically unsaturated monomers, including arylenes, such as styrene, vinyl toluene, and a-methyl styrene; butadiene; olefins; vinyl esters; vinyl halides; vinylidene chloride; (meth)acrylonitrile; $C_1$-$C_{40}$ alkyl esters of (meth)acrylic acid; for example, methyl(meth)acrylate, ethyl(meth)acrylate, n-butyl(meth)acrylate, 2-ethylhexyl(meth)acrylate, and other (meth)acrylates. Preferably, the hard copolymer, pA, is an acrylic or styrene-acrylic copolymer.

Suitable polymerizable monomers may further include at least one multiethylenically unsaturated monomer. Examples of multiethylenically unsaturated monomers that may be used include allyl(meth)acrylates; glycol di(meth)acrylates; and aromatic di- and tri-vinyl monomers, such as, divinylbenzene, and divinyltoluene.

Optionally, the copolymer may further contain as polymerized units, ionic ethylenically unsaturated monomers such as amide containing monomers, and ethylenically unsaturated carboxylic acid monomers, such as (meth)acrylic acid. Acid monomers are often present, to some extent, in their deprotonated form, and so can also be referred to as anionic monomers. In one embodiment, suitable levels of ionic ethylenically unsaturated monomer may be in the range of 0 to 10 weight %, preferably 0.1 to 5 weight %, and more preferably 0.5 to 4 weight %, based on the dry weight of the polymer particles.

The copolymer of the present invention may optionally have one or more acid functional group chosen from a phosphorus acid-functional group, a sulfur acid functional group, a polymeric side chain containing multi-acid functional groups, salts thereof, and combinations thereof. The phosphorus acid-functional group may be a (di)hydrogen phosphate group, phosphonate group, phosphinate group, alkali metal salt thereof, other salt thereof, or a combination thereof. The polymer may contain such acid functional groups at levels ranging from 0.1 to 15 wt. %, preferably, from 0.25 to 10 wt. %, and more preferably from 0.5 to 5 wt. %, based on the weight of the copolymer.

Suitable phosphorus acid group containing monomers may include, for example, (di)hydrogen phosphate esters of an alcohol containing a polymerizable vinyl or olefinic group, such as phosphates of hydroxyalkyl(meth)acrylates including hydroxyethyl(meth)acrylate. Other suitable monomers may include, for example, phosphonate functional monomers, like vinyl phosphonic acid. Preferred phosphorus acid monomers include phosphoethyl(meth)acrylate.

Alternatively, a polymer or a copolymer may be functionalized post-polymerization to give acid functional groups.

Acid functional groups may also include multi-acid functional groups that are formed from ethylenically unsaturated monomers and that contain multiple acid groups. The multi-acid functional groups may be incorporated into the polymer particle, for example, by including as polymerized units, a terminally unsaturated multiacid macromonomer.

Other suitable polymerizable monomers include hydroxy-, amine-, epoxy-, keto-, and isocyanate-functional monomers, autooxidizable monomers like acetoacetoxyalkyl (meth)acrylates, and small amounts of adhesion-promoting monomers; as well as polymerizable surfactants, including, but not limited to, Trem® LF-40 (Trem is a trademark of Henkel Corporation, King of Prussia, Pa.).

To limit the water sensitivity of the copolymer, the total amount of phosphorus acid, multi-acid, acid, hydroxyl, amine, ketone, aldehyde, aldol, keto-ester (acetoacetoxy), or aldimine group functional groups in the copolymer should not exceed 45 wt. %, or, alternatively, should not exceed 35 wt. %.

The vinyl copolymer (pA) of the hard component of the blend of the present invention may have a glass transition temperature (Tg) in the range of at least about 20° C., preferably at least 30° C., and more preferably at least 40° C. The hard copolymer Tg should range up to 90° C., or up to 80° C., or up to 70° C., or up to 60° C. Preferably, the polyurethane copolymer (pB) of the soft component of the blend of the present invention has a glass transition temperature (Tg) at least 15° C. lower than that of the hard copolymer component (pA). In one embodiment, the soft copolymer may have a Tg at least 30° C. lower than that of the hard copolymer, or at least 40° C. lower, or at least 50° C. lower, or at least 75° C. lower. In one embodiment, the soft copolymer may have at least one Tg in the range of not more than about 5° C., preferably not more than 0° C., more preferably not more than –15° C. or not more than –20° C., and most preferably not more than –25° C. The soft copolymer may have a Tg that ranges as low as –100° C., or as low as –80° C., or as low as –60° C., or as low as –50° C., or as low as –40° C. The weight ratio of the copolymer solids of pA to the copolymer solids of pB ranges from 50/50 to 90/10. In one embodiment, the amount of hard copolymer in the blend may range from 60% hard copolymer, or 65%, or 70%, or 75%, or 80% hard copolymer, up to an amount as high as 90% hard copolymer, or up to 85%, or 80%, or 75%, or 70% hard copolymer.

The vinyl copolymers useful in the aqueous compositions of this invention may be prepared by any known process which provides copolymerization of ethylenically unsaturated monomers. Suitable processes include suspension or emulsion polymerization at known polymerization temperatures of from room temperature to about 90° C. which may be optimized for the catalyst system employed. The copolymers may have monomer compositions, particle sizes, and particle size distributions like those of polymeric latex binders prepared by standard emulsion polymerization techniques known in the art. In addition, the copolymers of the invention may have a unimodal or a multimodal, including a bimodal, particle size distribution.

Emulsion polymerization techniques for preparing an aqueous dispersion of the copolymers from ethylenically unsaturated monomers are well known in the polymer arts, and any conventional emulsion technique for preparing the vinyl copolymer blend component, including single stage processes and multiple stage polymerization processes, may be used. In the latter case, the preparation of the first stage polymer can be carried out by means of various techniques, such as solution polymerization, bulk polymerization or emulsion polymerization. Preferably emulsion polymerization is used. In a particular embodiment, either or both of the blend components may comprise a copolymer (i.e. a stage) with an acid content greater than 20% acid monomer, or greater than 30%, or greater than 40%, and up to 70% acid monomer in the copolymer. Polymerization to form the polymer particles may be carried out using one or more water-soluble or water-insoluble polymerization initiator which thermally decompose(s) at the polymerization temperature to generate free radicals, such as, for example, persulfates, like ammonium or alkali metal (potassium, sodium, or lithium) persulfate. Polymerization initiators may be used alone or as the oxidizing component of a redox system, which also includes a reducing component, such as, for example, ascorbic acid or sodium formaldehyde sulfoxylate. Examples of redox catalyst systems include t-butyl hydroperoxide/sodium formaldehyde sulfoxylate/Fe(II), and ammonium persulfate/sodium bisulfite/sodium hydrosulfite/Fe(II). The initiator and the optional reducing component may be used in proportions from 0.001% to 5% each, based on the weight of the ethylenically unsaturated monomers in the monomer mixture to be polymerized. Accelerators such as chloride and sulfate salts of cobalt, iron, nickel, or copper may be used in small amounts.

Chain transfer agents may optionally be used to control the molecular weight of the polymers. Examples of suitable chain transfer agents include mercaptans, polymercaptans, and polyhalogen compounds, including alkyl mercaptans such as n-dodecyl mercaptan, which may be used from 0 to 10% by weight, based on the weight of the ethylenically unsaturated monomers in the monomer mixture used to prepare the polymer particles. The polymer molecular weight may be controlled by other techniques known in the art, such as selecting the ratio of the initiator to ethylenically unsaturated monomer.

Aggregation of the copolymers may be discouraged by including a stabilizing surfactant in the polymerization mixture in the polymerization vessel. Many examples of surfactants suitable for emulsion polymerization are given in McCutcheon's Detergents and Emulsifiers (MC Publishing Co., Glen Rock, N.J.), published annually. Other types of stabilizing agents such as protective colloids, may also be used. For example, methyl cellulose and hydroxyethyl cellulose may be included in the polymerization mixture.

The vinyl copolymers may be prepared as an aqueous dispersion or suspension with a solids level of from 20 to 70 weight %, preferably in the range of from 30 to 60 wt. %.

The compositions of the invention further include one or more polyurethane dispersion (PUD). Polyurethane polymers are generally made by reacting an organic polyisocyanate(s) with an organic compound(s) containing isocyanate-reactive groups, particularly a polyol. The reaction may be carried out in the presence of a catalyst such as organic tin compounds and/or tertiary amines. Preferably, the polyurethane copolymer, pB, is a soft polyurethane having a DSC Tg at least 15° C. lower than the Tg of pA.

The polyurethane polymers may be prepared in a "one shot" process in which all of the components may be reacted together, with or without solvent, to form the polyurethane. The reaction temperature may be up to about 150° C., but is preferably from 50° C. to 130° C. A more favored route to their formation involves the formation of an isocyanate-terminated polyurethane prepolymer followed by chain extension with an active hydrogen-containing compound. The polyurethane dispersion may be prepared from a first polyol, which may be a polyether; a second polyol, which may be a polyester, a polycaprolactam, a polycarbonate or a combination thereof, or a combination of at least one first polyol and at least one second polyol. In a preferred embodiment of the invention, the polyurethane contains 40% by weight or more, preferably, at least 44% by weight, more preferably at least 50% by weight, based on the weight of solid polyurethane dispersion, of the first polyol, the second polyol or a combination thereof, wherein the polyols provide soft segments of a high molecular weight.

In one embodiment of the invention, suitable first polyols include polyethers, such as, for example, polyethylene glycols, polypropylene glycols, or polytetramethylene glycols, or mixtures thereof, having a molecular weight ranging from 850, or from 1,000, or more preferably ranging from 1,500 or from 2,000, up to a molecular weight of 5,000 or more, preferably up to 3,000, and even more preferably up to 2,000. Preferably, the polyether polyol has a molecular weight greater than 1,000.

In another embodiment of the invention, the second polyol may be a polyester, a polycaprolactam or a polycarbonate, or a mixture thereof, having a molecular weight ranging from 1,500, or from 2,000, up to a molecular weight of 5,000 or more, preferably up to 4,000, or up to 3,000, and even more preferably up to 2,000.

Polyesters suitable for the second polyol of the invention include, for example, the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones, such as ε-caprolactone, may also be included.

Suitable polycarboxylic acids which may be used for the formation of polyester polyols may be aliphatic, cycloaliphatic, aromatic and/or heterocyclic and they may be substituted (e.g. by halogen atoms), saturated or unsaturated. Suitable aliphatic dicarboxylic acids include for example, succinic acid and adipic acid.

Suitable polyhydric alcohols which may be used for the preparation of the polyester polyols include, for example, ethylene glycol, propylene glycol, 1,4-butanediol, 1,6-hexanediol, neopentyl glycol, and others known in the art, as well as triols or tetraols such as trimethylolpropane, and pentaerythritol. Polyhydric alcohols may be used to prepare the polyester polyols by polycondensation with the above-mentioned polycarboxylic acids, but according to a particular embodiment they can also be added as such to the polyurethane reaction mixture.

Polycarbonates suitable for the second polyol of the invention include, for example, the reaction products of diols such as 1,4-butanediol, 1,6-hexanediol or diethylene glycol with phosgene; with diarylcarbonates such as diphenylcarbonate, or with cyclic carbonates such as ethylene and/or propylene carbonate.

Polycaprolactams suitable for the second polyol of the invention include for example, polycaprolactams (nylon 6) containing, (a) a carboxyl group attached to both ends of the polymer chain, (b) a carboxyl group attached to one end and an acetamide group attached to the other end of the polymer chain, (c) an amino group attached to both ends of the polymer chain, (d) a carboxyl group attached to one end and an amino group attached to the other end of the polymer chain. Particularly preferred is (d) above, a polycaprolactam having a carboxyl group attached to one end and an amino group attached to the other end of the polymer chain.

In a particular embodiment, the polyol may be one or more natural oil based polyol; such polyols are based on or derived from renewable feedstock resources such as natural and/or genetically modified plant vegetable seed oils and/or animal source fats. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used. Natural oil based polyols may be modified by known processes, such as, for example, epoxidation, hydroxylation, ozonolysis, esterification, hydroformylation, alkoxylation, or combinations thereof. Modified products may be further alkoxylated. The use of ethylene oxide (EO) or mixtures of EO with other oxides, introduces hydrophilic moieties into the polyol. The natural oil based polyols may constitute up to about 90 weight percent of a polyol blend. Combination of two types or more of natural oil based polyols may also be used.

The polyurethane dispersion of the invention may be anionic salt functional, non-ionic or anionic polyurethane dispersion. The polyurethane dispersion of the invention may be formed by any suitable method, as is known in the art.

In one embodiment of the invention, the polyurethane dispersion may be an anionic polyurethane dispersion that may be prepared by reacting at least one of the polyols of the invention with an organic compound having at least one acid group and at least two active hydrogen functionalities, and a polyisocyanate. In this embodiment, suitable organic compounds having at least one acid group and at least two active hydrogen functionalities (hereinafter the "organic compound") include, for example, 2,2-dimethylolacetic acid and 2,2-dimethylolpropionic acid. Examples of acid groups suitable for the organic compound include, carboxylic acid, sulfonic acid, phosphoric, phosphonic acid and the like. Preferred is the carboxylic acid group.

Polyisocyanates are well known in the art and include aliphatic, cycloaliphatic and/or aromatic isocyanates containing at least 2 isocyanate groups per molecule.

Suitable aliphatic diisocyanates include, for example, hexamethylene diisocyanate and propylene diisocyanate. Suitable cycloaliphatic diisocyanates include, for example, isophorone diisocyanate, and the hydrogenation products of aromatic diisocyanates such as (methyl)cyclohexylene diisocyanate. Suitable aromatic diisocyanates include, for example, toluene diisocyanate and methylene diphenylene diisocyanate, and others known in the art, as well as isomers or isomeric mixtures thereof. Suitable triisocyanates include, for example, the biuret of hexamethylene diisocyanate and water, the isocyanurate of hexamethylene diisocyanate, the product of addition of isophorone diisocyanate to trimethylolpropane. Preferred polyisocyanates are aliphatic or cycloaliphatic diisocyanates. Particularly preferred are dicyclohexylmethane diisocyanate, and isophorone diisocyanate.

The molecular weight of the resulting polyurethane may be from 2,000 to 50,000, preferably from 6,000 to 30,000, and most preferably from 8,000 to 20,000.

Before dispersing the polyurethane in water it may be at least partially neutralized with a tertiary amine, such as triethylamine, or an aminoalcohol, such as triethanolamine. After neutralization, the polyurethane may be diluted with deionized water under agitation to yield a finely divided dispersion.

Chain extension of the dispersed polyurethane dispersion with one or more diamine, e.g. ethylene diamine, or alkanolamine may be also carried out using methods well known in the art. In a particular embodiment, neither copolymer pA nor copolymer pB has any crosslinkable functionality other than carboxyl groups present from acid monomers. That is, in this embodiment, the system is not self-crosslinking.

The composition of the invention includes at least one coalescent which has a normal boiling point of from 150° C. to no greater than 300° C. Suitable coalescents may include any that have a boiling point of from 150° C. to no greater than 300° C. and which comprise liquids or fluids under normal use conditions, for example, at ambient temperature. Examples of suitable coalescents are chosen from diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof. Such coalescents, to the extent that they may have a boiling point of from 150° C. to no greater than 300° C. and which comprise liquids or fluids under normal use conditions, may include, for example, alkyl, branched alkyl, aryl, oxygenated alkyl, or alkylaryl esters of diacids, such as adipic acids, succinic acids, for example, diethyl adipate; alkyl, oxygenated alkyl, and branched alkyl esters of isobutyrates e.g. 2,2,4-trimethyl-1,3-pentanediol monoisobutyrate (Texanol™, Eastman, Kingsport, Tenn.); alkyl, branched alkyl, oxygenated alkyl, or alkylaryl phosphate esters; alkyl or alkoxyalkyl esters of isobutyrates, such as for example, 2,2,4-Trimethyl-1,3-pentanediol diisobutyrate (Texanol™ isobutyrate) or TXIB™ (Eastman); and (branched) alkyl, alkylaryl or alkoxyalkyl esters, glycerides, amides and alkoxylates of fatty acids.

In one embodiment of the invention, the coalescent may be added as an independent component during formulation of the composition of the invention. In one embodiment, the boiling point of the coalescent ranges from 170° C., or 180° C., or 190° C., up to 300° C., or 280° C., or up to 270° C.

Suitable total amounts of the coalescent will vary in proportion to the Tg of the copolymer, as more of the coalescent may be needed for a higher Tg copolymer. Suitable amounts of the coalescent may be 4 wt. % or more, or 5 wt. % or more, or 7 wt. % or more, or 10 wt. % or more, based on the total weight of the copolymers in the blend, and may range up to 30 wt. %, or less than 25 wt. %, or less than 20 wt. %. Preferably, the coalescent is added in an amount of from 5% to 20%, more preferably from 5% to 16%, or 10% to 16%, based on the total weight of solids of the copolymers in the blend.

The compositions of the invention are suitable for use in pigmented and unpigmented coating compositions for a variety of substrates such as metal, plastic, wood, and cementitious substrates, such as Portland cement based substrates, and natural stone. The compositions provide early hardness development of coating compositions containing blends of the polymer particles and coalescent of the invention. In formulating coating compositions, additives known in the art, such as external crosslinkers, e.g. diamines or polyamines, may be used.

EXAMPLES

These examples illustrate specific embodiments of the present invention. In the examples, the following abbreviations are used:
BA=butyl acrylate EHA=2-ethylhexyl acrylate
MMA=methyl methacrylate APS=ammonium persulfate
ALMA=allyl methacrylate PUD=polyurethane dispersion
AAEM=acetylacetoxy ethylmethacrylate
DMPA=dimethylol propionic acid
MAA=methacrylic acid NMP=methyl-2-pyrrolidinone
PEM[1]=phosphoethyl methacrylate EDA=ethylene diamine
STY=styrene MW=molecular weight

[1.] Throughout the Examples, "PEM" refers to addition of a material that is 50% active strong acid phosphorus-containing monomer, phosphoethyl methacrylate.

Rhoplex™ HG-31, Phoplex™ WL-71, Rhoplex™ WL-100: Aqueous emulsion polymer dispersions, Dow Advanced Materials, Philadelphia, Pa., USA.

Fomrez™ 66-112 (polyester polyol): Hexanediol adipate of molecular weight 1000, Chemtura Corporation, Middlebury, Conn.

Fomrez™ 44-56 and Fomrez™ M 44-57 (polyester polyols): Butanediol adipate of molecular weight 2000, Chemtura Corporation, Middlebury, Conn.

Piothane™ 500BA (polyester polyol): Butanediol adipate of molecular weight 500, Panolam Specialty Resins—Auburn, Me., USA Terathane™ 2000 (polyether polyol): Polytetramethylene ether glycol of molecular weight 2000, Invista, Wichita, Kans. Similarly, other Terathane "X" products, where "X" denotes the molecular weight.

DESW™: Dicyclohexylmethane diisocyanate, Bayer Corporation, Pittsburgh, Pa.

Tamol™ 2001: A dispersant, Dow Advanced Materials, Philadelphia, Pa.

Ninol™ 96SL: Lauryl diethanolamide, Stepan Company, Northfield, Ill.

Surfynol™ CT-1111: A surfactant. Air Products Corporation, Allentown, Pa.

Drewplus™ L-493: A defoamer. Ashland Chemical, Covington, Ky.

TiPure™ R-706: A pigment. E.I. du Pont de Nemours and Company, Wilmington, Del., USA.

Acrysol™ RM-8W and Acrysol™ RM-825: Thickeners. Dow Advanced Materials, Philadelphia, Pa., USA.

Zonyl™ FS-610: A surfactant, E.I. du Pont de Nemours and Company, Wilmington, Del., USA.

Texanol™: 2,2,4-Trimethyl-1,3-pentanediol monoisobutyrate, a coalescent. Eastman Chemical Co., Kingsport, Tenn., USA.

TXIB™: 2,2,4-Trimethyl-1,3-pentanediol diisobutyrate, a coalescent. Eastman Chemical Co., Kingsport, Tenn., USA.

Dibutyl Phthalate (DBP): a coalescent. Eastman Chemical Co., Kingsport, Tenn., USA.

Diethyl adipate: a coalescent. Aldrich Chemical Co., St. Louis, Mo., USA.

Dibutyl adipate: a coalescent. Aldrich Chemical Co., St. Louis, Mo., USA.

Butyl Cellosolve Ethylene glycol butyl ether (EB), a coalescent. Dow Chemical Company, Midland, Mich., USA.

Dowanol DPnB: Dipropylene glycol butyl ether, a coalescent. Dow Chemical Company, Midland, Mich., USA.

Dowanol DPM: Dipropylene glycol methyl ether, a coalescent. Dow Chemical Company, Midland, Mich., USA.

Exxate™ M 800 and Exxate™ 1200: Coalescents (Oxo-octyl acetate and Oxo-dodecyl acetate, respectively). Exxon Mobil Corporation, Irving, Tex., USA.

Edenol EFC (Loxanol EFC 100): Propylene glycol monooleate, a coalescent. Cognis, Monheim, Germany.

Kronitex KP-140: Tris(2-butoxyethyl) phosphate, a coalescent. Chemtura, Middlebury, Conn.

Clear Formulations

Clear coatings (30% solids by weight) were prepared according to the recipes given below. The ratio of Polymer A (hard polymer) to example PUD (soft polymer) was held constant at 70/30 by weight of solids. For the control composition, the hard acrylic polymer (Polymer A; DSC Tg=35° C.) was kept at 100% (i.e. no soft polymer). The amount of coalescent was held constant at 12% based on total polymer solids. The clear coating composition was formulated by additions of the formulation components shown below in Table 1 while stirring as practiced in the art.

TABLE 1

Clear Coating Formulation

| Ingredient | Weight Added (g)[1] |
|---|---|
| Polymer A (Hard Polymer, 45% solids) | 46.67 |
| Example PUD (Soft Polymer, 32% solids) | 28.13 |
| Water | 21.61 |
| Coalescent | 3.60 |
| Zonyl ™ FS-610 | 0.20 |
| Acrysol ™ RM-825 | 0.20 |

(Parts by weight, wet)
[1]Additions shown are wet weight of material; the hard-soft blend ratios are determined by polymer solids. The Example Soft PUD in the Table has 32% solids (i.e. 9.0 g of solids). If a 50% solids soft PUD is used, the wet addition would be 18.0 g (9.0 g of solids) in order to preserve the soft-hard blend ratio. Quantities of water are adjusted to give 30% solids.

Film Hardness Testing

The film hardness of the clear coatings described herein was tested on dried coatings (thickness 1.5 mils+/−0.1 mils) obtained by applying the wet coating to aluminum panels using a Bird applicator and allowing to dry under constant temperature and humidity conditions (25° C., 50% RH). Hardness testing was measured via König pendulum damping (according to the ASTM method ANS/ISO 1522, 1998(E)) as a function of time after sample preparation using a Byk Mallinckrodt Konig Pendulum Hardness Tester. In the test, a pendulum below the horizontal substrate is connected via two contact points on the film surface and is started from a 6° angle to the vertical. The pendulum is effectively damped according to the softness of the film. The test records the time taken to reach the 3° angle to the vertical, so that higher values (in seconds) show a reduced susceptibility of the film to dampen the pendulum. Longer times therefore denote harder coatings.

The desired hardness of the coating is dependent on the end-use application, however, preferably, the Hardness should be at least 50 Hardness Units (seconds), even more preferably at least 55 seconds, or at least 70 seconds, as measured by the hardness test (König pendulum damping) within 14 days after coating the substrate. Exemplary coating systems show early Hardness (within 14 days) of at least 90 seconds. Blends of the invention develop early hardness that is greater than that developed by films produced from either of the constituent blend components (i.e. greater than films comprising either 100% copolymer, pA, or 100% polyurethane, pB).

Different Hard Phases

In Table 2, 70/30 hard-soft blends, using high Tg (DSC Tg>20° C.) non-film forming commercial polymers and a soft PUD, were formulated as shown in Table 1 and drawn down to produce clear films. HG-31, WL-100 and WL-71, with glass transition temperature (DSC Tg) of 33° C., 43° C., and 43° C., respectively, are styrene-acrylic binders (non-PEM, non-AAEM containing) with 5% or less carboxylic acid monomer. PUD B(i) is a soft polyether polyol PUD (DSC Tg: −80° C.) with the following composition: 29.6 DesW/61.8 Terathane 2000/1.2 Ninol 96SL/6.0 DMPA/1.4 EDA.

The effect of the soft polymer component on the coating hardness is shown in Table 2 below. Other than the control samples, which show the hardness development for the hard polymer alone, the coating hardness is for the dried film of the 70/30 (hard/soft) polymer blend with PUD B(i) as the soft component.

TABLE 2

Hardness of Films from Hard-Soft Blends for Some Hard Commercial Polymers

| Ingredient[1,2] | | | | | | | |
|---|---|---|---|---|---|---|---|
| HG-31 (45%) | 66.7 | 46.7 | | | | | |
| WL-100 (50.5%) | | | 59.4 | 41.6 | | | |
| WL-71 (41%) | | | | | 72.6 | 50.8 | |
| PUD B(i) (32%) | 0 | 28.1 | 0 | 28.1 | 0 | 28.1 | 93.7 |
| Texanol | 3.60 | 3.60 | 3.60 | 3.60 | 4.80 | 4.80 | 3.60 |
| % PUD | 0 | 30 | 0 | 30 | 0 | 30 | 100 |
| Pendulum Hardness, 1 wk dry, (sec) | 32 | 66 | 44 | 66 | 62 | 92 | 38 |

[1]HG-31, WL-100 and WL-71 are commercial styrene-acrylic binders, available from Dow Advanced Materials, Philadelphia, PA, USA.
[2]PUD B(i) may be prepared following the procedure of PUD Example B1, below, but with the composition as shown above.

It can be seen that addition of a soft copolymer PUD as a minor component of a hard-soft blend can have the effect of drastically improving early hardness development of the resulting film (over the first 7 days) compared to that for films of the constituent hard acrylic copolymer alone or the PUD alone. For the examples herein, all of the PUDs of the inventive blends have at least one Tg no greater than −30° C.

Effect of Coalescent on Hardness Development for Clear Films

The effect of various coalescents (12% by weight based on total polymer solids) of different boiling point on the hardness development of clear films of the 70/30 hard/soft blends is shown in Tables 3 and 4, below. These clear coatings were formulated as described above (Table 1). For both Table 3 and 4, the 70% component is Polymer A(i) (a hard acrylic polymer) and the 30% component is PUD B(i) (a soft polyether polyol PUD, described above).

TABLE 3

Hardness Development - Effect of High Boiling Point Coalescent

| Ingredient | | |
|---|---|---|
| Polymer A(i) (45%)[1] | 66.67 | 46.67 |
| PUD B(i) (32%) | 0 | 28.13 |
| Dibutyl phthalate | 3.60 | 3.60 |
| % PUD | 0 | 30 |
| Pendulum Hardness, 1 wk dry, (sec) | 38 | 28 |

[1] Polymer A(i) may be prepared following the procedure of Example A1 Polymer, below, but with the composition: 10 STY/30.5 EHA/51.3 MMA/5 AAEM/3.2 PEM.

The 70/30 hard-soft blends fail to timely develop to their full potential film hardness when a high boiling point coalescent is used, as shown above (Table 3) using dibutyl phthalate (boiling point=340° C.) as the coalescent. Table 4, below, shows the film hardness after 1 day and 7 days for the same acrylic/PUD blend, formulated in the same manner, except varying the coalescent.

TABLE 4

Effect of Coalescent on Hardness Development of 70/30 Blends.

| Coalescent | Boiling Point | 1 day hardness (sec) | 7 day hardness (sec) |
|---|---|---|---|
| Butyl cellosolve | 169-173 | 120 | 130 |
| Exxate 800 | 186-215 | 125 | 128 |
| DPnB | 230 | 57 | 85 |
| Texanol | 255 | 44 | 123 |
| Exxate 1200 | 240-285 | 37 | 127 |
| Diethyl adipate | 250-252 | 24 | 108 |
| TXIB | 280 | 21 | 72 |
| Dibutyl adipate | 305 | 14 | 15 |
| DBP | 340 | 23 | 28 |
| Edenol EFC | >350 | 23 | 27 |
| KP-140 | >350 | 25 | 24 |

It can be seen that the early hardness development for the hard-soft blends is critically dependent on the coalescent normal boiling point. Early hardness development is greatly improved for all of the coalescents with normal boiling point below 300° C., and, generally, optimum hardness is obtained more readily for the lower boiling point coalescents. However, coalescents with normal boiling point greater than 300° C. show essentially no improvement in hardness compared to films of the hard copolymer alone. If the coalescent remains trapped in the hard polymer phase, the hard copolymer film is unable to attain its maximum hardness while the coalescent is still present in the film. Addition of the soft PUD provides a pathway for the coalescent to escape and therefore allows the majority hard phase copolymer film to attain its theoretical maximum hardness. The lower the normal boiling point of the coalescent, the easier it is for the coalescent to diffuse and evaporate out of the film.

Hardness as a Function of Soft Copolymer Content in Clear Films

Clear films were produced from formulations analogous to those above, but with varying percentage of soft PUD in the blend. The texanol level was 12% based on the acrylic polymer. Total texanol levels are reported in the table (Table 5).

TABLE 5

Hardness as a Function of the Percentage of Soft PUD in the Blend

| | Ex 1* | Ex 2* | Ex 3 | Ex 4 | Ex 5 | Ex 6 | Ex 7* |
|---|---|---|---|---|---|---|---|
| Polymer A(i) | X | X | X | X | X | X | |
| PUD B(i) | | X | X | X | X | X | X |
| Texanol | 12 | 10.8 | 9.6 | 8.4 | 7.2 | 6 | 0 |
| % PUD | 0% | 10% | 20% | 30% | 40% | 50% | 100% |
| Hardness (7 Day) | 29 | 36 | 148 | 127 | 99 | 84 | 49 |

*Comparative

Table 5 shows hardness as a function of the percentage of soft polymer (PUD B(i)) in a hard/soft blend, and appears to show that the escape of coalescent from the film is dependent on the presence of some minimum amount of soft copolymer particles. It can be seen that there is no appreciable hardness development for levels of the soft copolymer as low as 10% in the hard/soft blend. However, there is significant hardness development seen for levels of soft component of 20% (and up to 50%) in this system where the Texanol coalescent has a large effect in softening the hard component (which may be required for adequate film formation and toughness).

The most common type of lattice structure adopted by latex polymer particles of similar particle size, upon evaporation of the aqueous phase and prior to film formation, is expected to be a close packed lattice structure, such as body-centered cubic (BCC), face-centered cubic (FCC) and hexagonal closest packed (HCP). In such close-packed systems, the site percolation threshold (the minimum packing density in a 2-component blend that leads to formation of continuous diffusion pathways) is generally ~20% (see, for example, "Introduction to Percolation Theory", $2^{nd}$ Ed., page 17, D. Stauffer and A. Aharony, 1991, Taylor & Francis, Inc., Washington, D.C., USA). In the hard-soft blends of the invention, the data suggest that it is important that the soft component forms a pathway through the film in order to enhance the diffusion and evaporation rate of the coalescent.

Examples A1-A4

Preparation of Copolymers

Example A 1

A polymer emulsion having the composition 30 STY/30.5 EHA/31.3 MMA/5 AAEM/3.2 PEM was prepared as follows:

A (first) monomer emulsion (ME1) was prepared using 450 g of DI water, 50.3 g of 30.5 weight percent active ingredient sodium laureth sulfate with an ethylene oxide level of 1 to 4, 555 g STY, 564 g EHA, 579 g of methyl methacrylate, 92.5 g of AAEM and 59.6 g of PEM. A five-liter, 4-neck round bottom flask containing an initial charge of 1300 g DI water and a solution of 10 g of 30 weight percent active ingredient sodium laureth sulfate with an ethylene oxide level of 1 to 4 in 15 g of water, followed by a rinse of 20 g of DI water, was heated to 88° C. under nitrogen sweep. An aliquot of ME1 (55 g) was added to the flask along with a rinse of 25 g of DI water which was followed by the addition of 6.5 g APS dissolved in 30 g DI water and a rinse of 10 g of DI water. After stirring for 15 minutes, the remaining ME1 and a solution of 2.8 g of APS in 70 g of DI water were added linearly and separately to the reaction flask over 2 hours. The temperature of the batch in the kettle was maintained at 85-86° C. during the addition. When all additions were complete, the ME1 container was rinsed with 40 g of DI water and the APS container was rinsed with 5 g of water which were then added to the reaction flask. A catalyst/activator pair was added after the monomer emulsion feed was completed. The polymer was neutralized with aqueous ammonia (29%). The solids content was 45.3%.

Example A2

A polymer emulsion having the composition 18 BA/21.3 MMA/0.2 MAA/0.4 ALMA//21.5 BA/26.2 MMA/9.2 AAEM/3.2 PEM was prepared as follows:

A second monomer emulsion (ME2) was prepared using 180 g of DI water, 6.7 g of 59 weight percent active ingredient surfactant PEG™ 200 nonyl phenyl ether sulfate (Rhodia, Cranbury, N.J.), ammonium salt, 5.6 g of 25 weight percent active sodium lauryl sulfate, 361 g of BA, 427 g of MMA, 4 g of MAA and 8.0 g of ALMA. A five-liter, 4-neck round bottom flask containing an initial charge of 1337 g deionized (DI) water and a solution of 20.6 g of 59 weight percent active ingredient PEG™ 200 nonyl phenyl ether sulfate, ammonium salt in 20 g of water, followed by a rinse of 30 g of DI water, was heated to 84° C. under nitrogen sweep. An aliquot of ME2 (104 g) was added to the flask. The container containing the aliquot of ME2 was rinsed with 30 g of DI water which was then added to the flask, followed by the addition of 4 g sodium persulfate dissolved in 35 g DI water. After stirring for 15 minutes, the remaining ME2 and a solution of 0.75 g of APS in 54.8 g of DI water were added linearly and separately to the reaction flask over 0.8 hours. The temperature of the batch in the kettle was maintained at 84-86° C. during the addition. When all additions were complete, the ME2 container was rinsed with 25 g of DI water, which was then added to the reaction flask. The reaction was allowed to stir for 30 minutes.

A third monomer emulsion, (ME3) was prepared using 300 g of DI water, 15.7 g of 59 weight percent active ingredient surfactant PEG 200 nonyl phenyl ether sulfate, ammonium salt, 431 g BA, 525 g of MMA, 185 g of AAEM, and 64.7 g of PEM. ME3 and a solution of 1.25 g of ammonium persulfate in 91.2 g of DI water were added linearly and separately to the reaction flask over 1.7 hours. The temperature of the batch in the kettle was maintained at 85-86° C. during the addition. When all additions were complete, the ME3 container was rinsed with 30 g of DI water and the APS container was rinsed with 5 g of water, which were then added to the reaction flask. A catalyst/activator pair was added after the monomer emulsion feed was completed. The polymer was neutralized with aqueous ammonia (29%). The solids content was 46.8%.

Example A3

A polymer having a composition of 18 BA/21.3 MMA/0.2 MAA/0.4 ALMA//21.5 BA/27.9 MMA/9.2 AAEM/1.5 MAA was prepared as described for Example A2 except that MAA was used and PEM was omitted.

Example A4

A polymer emulsion having the composition 35.2 BA/56.6 MMA/5 AAEM/3.2 PEM was prepared as follows:

A fourth monomer emulsion (ME4) was prepared using 450 g of DI water, 42 g of 30.8 weight percent active ingredient sodium laureth sulfate with an ethylene oxide level of 1 to 4, 651 g BA, 1047 g MMA, 59.6 g of PEM, and 92.5 g of AAEM. A five-liter, 4-neck round bottom flask containing an initial charge of 1285 g DI water and a solution of 33 g of 30 weight percent active ingredient sodium laureth sulfate with an ethylene oxide level of 1 to 4 in 25 g of water, followed by a rinse of 25 g of DI water, was heated to 88° C. under nitrogen sweep. An aliquot of ME4 (60.5 g) was added to the flask along with a rinse of 25 g of DI water which was followed by the addition of 6.5 g APS dissolved in 30 g DI water and a rinse of 10 g of DI water. After stirring for 15 minutes, the remaining ME4 and a solution of 2.8 g of APS in 70 g of DI water were added linearly and separately to the reaction flask over 2 hours. The temperature of the batch in the kettle was maintained at 85-86° C. during the addition. When all additions were complete, the ME4 container was rinsed with 40 g of DI water and the APS container was rinsed with 5 g of water which were then added to the reaction flask. A catalyst/activator pair was added after the monomer emulsion feed was completed. The polymer was neutralized with aqueous ammonia (29%). The solids content was 44.5%. This preparation method may also be adapted to prepare other analogous acrylic copolymers.

Examples B1-B3

Preparation of Polyurethane Dispersions (PUDs)

Example B1

Example B1 provides a polyether polyol PUD, wherein the polyether polyol has a molecular weight of 2000. A PUD having a composition of 28.2 DESW/63.7 Terathane 2000/5.9 DMPA/2.2 EDA was prepared as follows:

The following reaction components were provided:

| | |
|---|---|
| Polytetramethylene ether glycol of molecular weight 2000 | 530.0 g |
| Dicyclohexylmethane diisocyanate (DESW) | 235.0 g |
| Dimethylol propionic acid (DMPA) | 49.0 g |
| Methyl-2-pyrrolidinone (NMP) | 203.0 g |

The polytetramethylene ether glycol was dried at 80° C. for two hours under vacuum in a resin flask equipped with a mechanical stirrer, thermometer, nitrogen inlet and condenser. After cooling to 60° C., DMPA, NMP and dicyclohexylmethane diisocyanate were charged to the flask. The mixture was heated to 95° C. and stirred until the percent isocyanate content was 2.1% by titration and remained constant. The reaction product was an isocyanate functional prepolymer.

After cooling to 75° C., triethyl amine (36.9 g) was added to the prepolymer mixture and stirred for thirty minutes. Next, the neutralized prepolymer was dispersed by addition to water with high shear mixing. Immediately after dispersion, the chain extender solution of ethylene diamine (EDA) in water (18.2/36.4 g) was added with stirring at room temperature and was continued for two hours, resulting in an aqueous PUD having a solids content of 33.3%, particle size of 72 nm, and pH of 9.9. This preparation method may also be adapted to prepare other analogous polyether polyol PUDs.

Example B2

Example B2 provides a polyester polyol PUD, wherein the polyester polyol has a molecular weight of 1000. A PUD having a composition of 38.9 DESW/51.5 Fomrez 66-112/5.8 DMPA/3.9 EDA was prepared as follows:

The following reaction components were provided:

| | |
|---|---|
| Hexanediol adipate of molecular weight 1000 | 478.0 g |
| Dicyclohexylmethane diisocyanate | 361.0 g |
| Dimethylol propionic acid (DMPA) | 53.8 g |
| Methy-2-pyrrolidinone (NMP) | 215.0 g |

The hexanediol adipate (MW 1000) was dried at 80° C. for two hours under vacuum in a resin flask equipped with a mechanical stirrer, thermometer, nitrogen inlet and condenser. After cooling to 60° C., DMPA, NMP and dicyclohexylmethane diisocyanate were charged to the flask. The mixture was heated to 95° C. and stirred until the percent isocyanate content was 3.7% by titration and remained constant. The reaction product was an isocyanate functional prepolymer.

After cooling to 75° C., triethyl amine (40.6 gms) was added to the prepolymer mixture and stirred for thirty minutes. Next, the neutralized prepolymer was dispersed by addition to water with high shear mixing. Immediately after dispersion, the chain extender solution of ethylene diamine in water (35.0/70.0 g) was added and stirring at room temperature was continued for two hours, resulting in an aqueous PUD having a solids content of 33.2%, particle size of 47 nm, and pH of 9.8. This preparation method may also be adapted to prepare other analogous polyester polyol PUDs.

Example B3

Example B3 provides a polyester polyol PUD, wherein the polyester polyol has a molecular weight of 2000. A PUD having a composition of 29.7 DesW/61.8 Fomrez 44-56/1.2 Ninol 96SL/5.9 DMPA/1.4 EDA was prepared as follows:

The following reaction components were provided:

| | |
|---|---|
| Butanediol adipate of molecular weight 2000 | 434.7 g |
| Dicyclohexylmethane diisocyanate | 208.2 g |
| Dimethylol propionic acid (DMPA) | 41.5 g |
| Lauryl diethanolamide (90%) | 9.0 g |
| Methy-2- pyrrolidinone (NMP) | 170.0 g |

The butanediol adipate and lauryl diethanolamide were dried at 80° C. for two hours under vacuum in a resin flask equipped with a mechanical stirrer, thermometer, nitrogen inlet and condenser. After cooling to 60° C., DMPA, NMP and dicyclohexylmethane diisocyanate were charged to the flask. The mixture was heated to 95° C. and stirred until the percent isocyanate content was 2.2% by titration and remained constant. The reaction product was an isocyanate functional prepolymer.

After cooling to 75° C., triethyl amine (31.3 g) was added to the prepolymer mixture and stirred for thirty minutes. Next, the neutralized prepolymer was dispersed by addition to water with high shear mixing. Immediately after dispersion, the chain extender solution of ethylene diamine in water (9.8/19.7 g) was added and stirring at room temperature was continued for two hours, resulting in an aqueous PUD having a solids content of 31.9%, particle size of 54 nm, and pH of 7.6. This preparation method may also be adapted to prepare other analogous polyester polyol PUDs.

Examples 1-54

Preparation and Testing of Paints

Examples 1-5

White gloss paints (18 Pigment Volume Content (PVC), 33% volume solids) based on the copolymers and polyurethane dispersions were prepared according to the recipes given in Table 7 below, where the TiO2 dispersions were prepared from dry TiO2 pigment. The composition of the TiO2 dispersion is described in Table 6. The amount of the high boiling coalescent was held at 12 wt. %, based on the weight of acrylic polymer solids. In those examples where the PUDs were formulated by themselves, no plasticizer was used, and the solids level of the paint was reduced some to accommodate for the lower solids of the PUDs.

Film hardness of the white gloss paints was tested on dried paints (thickness approximately 62 μm or 2.5 mil) applied to aluminum panels at a wet film thickness of 307 μm or 12 mils. Hardness testing was measured via pendulum damping as a function of time after sample preparation. Unless otherwise noted, all of the paints described herein were prepared and tested in this manner. That is, the examples herein utilize the same TiO2 dispersion and the same paint formulation components.

TABLE 6

Composition of TiO2 dispersion

| Ingredient | Parts by Weight |
|---|---|
| Water | 5.65 |
| Tamol ™ 2001 dispersant | 1.18 |
| Surfynol ™ CT-111 | 0.23 |
| Aqueous ammonia (28%) | 0.23 |
| Drewplus ™ L-493 | 0.11 |
| TiPure ™ R-706 | 24.79 |

Acrylic-PUD blends were formulated into paints as shown in Table 7, below. The hard acrylic polymer and soft PUD's were prepared as described above, and have compositions:

A1 Polymer=30 STY/30.5 EHA/31.3 MMA/5 AAEM/3.2 PEM;

B1 PUD (polyether polyol PUD)=28.2 DESW/63.7 Terathane 2000/5.9 DMPA/2.2 EDA (Terathane 2000=Polytetramethylene ether glycol of molecular weight 2000);

B2 PUD (polyester polyol PUD)=38.9 DESW/51.5 Fomrez 66-112/5.8 DMPA/3.9 EDA (Fomrez 66-112=Hexanediol adipate of molecular weight 1000).

TABLE 7

Paint Compositions and Pendulum Hardness: Effect of Soft PUD on Hardness

| Ingredient | 1* | 2 | 3* | 4 | 5* |
|---|---|---|---|---|---|
| Example A1 Polymer | 66.78 | 53.43 | | 53.43 | |
| Example B1 PUD | | 18.12 | 90.66 | | |
| Example B2 PUD | | | | 18.23 | 91.21 |
| Water | 20.93 | 17.32 | 1.23 | 17.48 | 1.71 |
| Aqueous ammonia (28%) | 0.46 | | | | |
| TiO2 dispersion | 32.19 | 32.19 | 32.19 | 32.19 | 32.19 |
| Texanol ™ | 3.63 | 2.90 | | 2.90 | |
| Acrysol ™ RM-8W | 0.34 | 0.62 | 1.23 | 0.45 | 1.70 |
| % PUD | 0 | 20% | 100% | 20% | 100% |
| Pendulum Hardness, 1 week dry (sec) | 17 | 94 | 46 | 39 | 71 |

*Comparative

As shown in Table 7, above, a Pendulum Hardness test showed a hardness achieved with the waterbased paint film of the present invention (Example 2) to be more than double that achieved with the comparative Example 3, made using the same PUD, and is about five times that of Example 1, made using the same copolymer. Inventive Example 2 comprises a PUD made with a polyether polyol with a molecular weight of 2000. On the other hand, the blend of Example 4, which comprises a PUD made with a polyester polyol with a molecular weight of 1000, fails to show enhanced hardness; the resulting coating is not as hard (hardness of 39 sec) as the constituent 100% PUD polymer (Example 5, hardness of 71 sec). Accordingly, the formulated coalescent in a softer PUD made from a softer, higher molecular weight polyol greatly improves coating hardness of an ambient curable coating.

Examples 6-13

Additional white gloss paints (18PVC, 33% volume solids) were prepared in the same manner as described above, using the copolymers, polyurethane dispersions and coalescents as shown in Table 8, below. Two analogous 2-stage polymers (with and without PEM) were compared in blends with soft PUD's:

Example A2 Polymer=18 BA/21.3 MMA/0.2 MAA/0.4 ALMA//21.5 BA/26.2 MMA/9.2 AAEM/3.2 PEM;

Example A3 Polymer=18 BA/21.3 MMA/0.2 MAA/0.4 ALMA//21.5 BA/27.9 MMA/9.2 AAEM/1.5 MAA;

Example B1 PUD=28.2 DESW/63.7 Terathane 2000/5.9 DMPA/2.2 EDA (Terathane 2000=Polytetramethylene ether glycol of molecular weight 2000);

Example B2 PUD=38.9 DESW/51.5 Fomrez 66-112/5.8 DMPA/3.9 EDA (Fomrez 66-112=Hexanediol adipate of molecular weight 1000).

The amount of high boiling coalescent was held at 12% on the acrylic copolymer particle solids. Hardness testing of the paints was measured as described above (via pendulum damping).

TABLE 8

Paint Compositions and Pendulum Hardness: Effect of Soft PUD on Hardness

| Ingredient | 6* | 7 | 8* | 9 | 10* | 11* | 12 | 13* |
|---|---|---|---|---|---|---|---|---|
| Example A2 Polymer | 65.26 | 45.68 | | 45.68 | | | | |
| Example A3 Polymer | | | | | | 69.40 | 47.64 | 47.64 |
| Example B1 PUD | | 27.20 | 82.42 | | | | 28.42 | |
| Example B2 PUD | | | | 27.36 | 82.91 | | | 28.60 |
| Texanol ™ | 3.63 | 2.54 | | 2.54 | | 3.87 | 2.66 | 2.66 |
| % PUD | 0% | 30% | 100% | 30% | 100% | 0% | 30% | 30% |
| Pendulum Hardness (sec) | | | | | | | | |
| 1 week dry | 13 | 38 | 43 | 31 | 70 | 15 | 45 | 41 |
| 2 week dry | 14 | 55 | 46 | 45 | 73 | 17 | 66 | 64 |

*Comparative

Coatings prepared using 100% of a PUD, such as Example B 1 PUD (Example 8) or Example B2 PUD (Example 10), have poor water resistance, whereas coatings prepared from 100% acrylic polymers have good water resistance. Blending PUD's with acrylic polymers provides a route to produce coatings with good water resistance properties, and also provides a route to access the desired coating hardness that otherwise is not achieved by the 100% acrylic polymer coatings despite the high glass transition temperature of the constituent polymer. For both acrylic polymers, A2 (with PEM) and A3 (without PEM), the hard-soft blend results in enhanced hardness (compared to that for the constituent 100% component polymers) in the case of blends with Example B1 PUD (comprising the polyether polyol of molecular weight 2000), but not for the blends with Example B2 PUD (comprising the polyester polyol of molecular weight 1000).

Examples 14-18

Hardness development studies were also performed for similarly formulated paints comprising hard-soft acrylic-PUD blends comparing blends comprising acrylic polymers with and without AAEM. In Table 9 below, the acrylic polymers and PUD have the following compositions:

Example Polymer A5=32.5 EHA/64.3 MMA/3.2 PEM;

Example Polymer A6=32.5 EHA/59.3 MMA/5 AAEM/3.2 PEM;

Example PUD B1: 28.2 DesW/63.7 Terathane 2000/5.9 DMPA/2.2 EDA (NMP) (Terathane™ 2000: Polytetramethylene ether glycol, MW 2000).

TABLE 9

Paint Compositions and Pendulum Hardness: Effect of Crosslinking Monomer

| Ingredient[1] | Example No. | | | | |
|---|---|---|---|---|---|
| | 14* | 15 | 16* | 17 | 18* |
| Example A6 Polymer (AAEM) | X | X | | | |
| Example A5 Polymer (non-AAEM) | | | X | X | |
| Example B1 PUD | | X | | X | X |
| Texanol ™ | X | X | X | X | |
| % PUD | 0 | 20 | 0 | 20 | 100 |
| Pendulum Hardness (sec) | | | | | |
| 3 day dry | 24 | 67 | 25 | 76 | 49 |
| 14 day dry | 25 | 119 | 25 | 118 | 48 |

*= comparative
[1]Example A5 Polymer and Example A6 Polymer are prepared in an analogous method to that for Example A4 Polymer, adjusting monomer amounts for the desired composition.

Both of the 80/20 hard-soft blends show greatly enhanced early hardness development compared to either the all acrylic (Examples 14 and 16) or all PUD (Example 18) constituent polymers. The early hardness development is effective for the blend composition irrespective of the presence (Example 15) or absence (Example 17) of the crosslinking monomer, AAEM.

Examples 19-27

Effect of Coalescent Oil Hardness of Paint Films

Additional white gloss paints were prepared in the same manner as described above, using the copolymers, polyurethane dispersions and coalescents as shown in Table 10, below. The amount of high boiling coalescent was held at 12% on the polymer particle solids. Hardness testing of the paints was measured as described above via pendulum damping.

TABLE 10

Hardness of Paints

| Ingredient | Example 19* | Example 20 |
|---|---|---|
| Example A4 Polymer | 136.63 | 96.40 |
| Example B3 PUD | | 58.28 |
| TXIB ™ | 7.46 | 5.25 |
| % PUD | 0% | 30% |
| Pendulum Hardness (sec) | | |
| 1 day dry | 22 | 27 |
| 14 day dry | 27 | 95 |

*Comparative

Table 10 shows that early hardness development of coatings based on 100% of the Example A4 Polymer (Example 19) is poor, while the hardness of Example 20 of current invention increases rapidly after a few days of drying. Example B3 PUD is a polyester polyol PUD, wherein the polyester polyol has a molecular weight of 2000. Accordingly, the combination of a soft (molecular weight 2000) polyester polyol PUD, copolymer and the high boiling coalescent at about 12 wt. %, based on polymer solids, provides hardness development like a PUD with only 30% of polymer solids as a PUD.

Table 11, below, shows that a range of blend ratios can result in early hardness development. Example A1 Polymer and Example B1 PUD are described above.

TABLE 11

Paint Compositions and Pendulum Hardness

| Ingredient | Example No. | | | | | | |
|---|---|---|---|---|---|---|---|
| | 21* | 22 | 23 | 24 | 25 | 26 | 27* |
| Example A1 Polymer | X | X | X | X | X | X | |
| Example B1 PUD | | X | X | X | X | X | X |
| 12% Texanol ™ | | X | X | X | | | |
| 5% DPnB/10% DPM | | | | | X | | |
| 5% DPnB/10% EB | | | | | | X | |
| % PUD | 0 | 20 | 30 | 50 | 20 | 20 | 100 |
| Pendulum Hardness (sec) | | | | | | | |
| 1 day dry | 15 | 36 | 49 | 52 | 97 | 73 | 50 |
| 5 day dry | 18 | 109 | 95 | 69 | 116 | 116 | 50 |
| 14 day dry | 17 | 102 | 87 | 60 | 108 | 106 | 50 |

*= comparative

Examples 28-35

Effect of Molecular Weight of the Polyether Polyol Component of PUD

The paints shown in Table 12, below, employed blends (as shown) comprising the following polymer and PUD compositions:

Example A1 Polymer=30 STY/30.5 EHA/31.3 MMA/5 AAEM/3.2 PEM;

Example B4 PUD: 25.6 DesW/67.1 Terathane 2900/6.1 DMPA/1.2 EDA (NMP) (Terathane 2900—polytetramethylene ether glycol, MW-2900);

Example B5 PUD: 28.6 DesW/64.0 Terathane 2000/6.0 DMPA/1.4 EDA (NMP) (Terathane 2000—Polytetramethylene ether glycol, MW 2000);

Example B6 PUD: 37.5 DesW/53.5 Terathane 1000/6.0 DMPA/3.0 EDA (NMP) (Terathane™ 1000—Polytetramethylene ether glycol, MW 1000);

Example B7 PUD: 43.9 DesW/48.0 Terathane 650/6.0 DMPA/2.1 EDA (NMP) (Terathane 650—polytetramethylene ether glycol, MW-650).

TABLE 12

Hardness: Effect of Molecular Weight of the Polyether Polyol Component of PUD

| Ingredient | 28* | 29 | 30 | 31 | 32* | 33 | 34 | 35* |
|---|---|---|---|---|---|---|---|---|
| Example A1 Polymer | X | X | X | X | X | | | |
| Example B4 PUD | | X | | | | X | | |
| Example B5 PUD | | | X | | | | X | |
| Example B6 PUD | | | | X | | | | |
| Example B7 PUD | | | | | X | | | X |
| Texanol ™ | X | X | X | X | X | | | |
| % PUD | 0 | 20 | 20 | 30 | 20 | 100 | 100 | 100 |

TABLE 12-continued

Hardness: Effect of Molecular Weight of the Polyether Polyol Component of PUD

|  | 28* | 29 | 30 | 31 | 32* | 33* | 34* | 35* |
|---|---|---|---|---|---|---|---|---|
| Pendulum Hardness | | | | | | | | |
| 1 day dry (sec) | 17 | 42 | 39 | — | 18 | 48 | 49 | 50 |
| 7 day dry(sec) | 20 | 84 | 84 | — | 36 | 48 | 48 | 67 |
| 14 day dry (sec) | 20 | 94 | 97 | 71 | 43 | 45 | 46 | 62 |

*= comparative

The components of the PUD compositions maintain a constant —NCO to —OH ratio. The data show that the film hardness development is greatly improved for blend compositions with 20% soft PUD, wherein the PUD comprises a polyether polyol with molecular weight of at least 1000 (Examples 29-31). However, blends with 20% of PUD B7 (comprising a polyether polyol of molecular weight 650) fail to timely attain a good level of hardness (i.e. the hardness of Example 32 is lower than that of the constituent PUD, Example 35).

Examples 36-45

Effect of Molecular Weight of the Polyester Polyol Component of PUD

The paints shown in Table 13, below, employ blends (as shown) comprising the following polymer and PUD compositions:

Example A1 Polymer 30 STY/30.5 EHA/31.3 MMA/5 AAEM/3.2 PEM

Example B8 PUD: 28.6 DesW/63.9 Fomrez 44-57/6.1 DMPA/1.4 EDA (NMP) (Fomrez 44-57=butanediol adipate, MW 2000)

Example B9 PUD: 48.4 DesW/43.2 Piothane 500BA/6.0 DMPA/2.4 EDA (NMP) (Piothane 500BA=butanediol adipate, MW 500)

TABLE 13

Hardness: Effect of Molecular Weight of the Polyester Polyol Component of PUD

| Ingredient | Example 36* | Example 37 | Example 38* |
|---|---|---|---|
| Example A1 Polymer | X | X | X |
| Example B8 PUD | | X | |
| Example B9 PUD | | | X |
| Texanol ™ | X | X | X |
| % PUD | 0 | 30 | 30 |
| Pendulum Hardness (sec) | | | |
| 1 day dry | 17 | 29 | 18 |
| 7 day dry | 18 | 77 | 29 |
| 14 day dry | 18 | 91 | 34 |

*= comparative

The data show that the film hardness development is greatly improved for blend compositions with 30% soft PUD, wherein the PUD comprises a polyester polyol with molecular weight of at least 2000 (Example 37). However, blends with 30% of PUD B9 (comprising a polyester polyol of molecular weight 500) fail to timely attain a good level of hardness (Example 38).

Table 14, below, uses the following compositions:

Example A6 Polymer=32.5 EHA/59.3 MMA/5 AAEM/3.2 PEM;

Example B1 PUD: 28.2 DesW/63.7 Terathane 2000/5.9 DMPA/2.2 EDA (NMP) (Terathane™ 2000—Polytetramethylene ether glycol, MW 2000);

Example B10 PUD: 38.8 DesW/52.5 Fomrez 55-112/6.9 DMPA/1.8 EDA (NMP) (Fomrez 55-12—Polyneopentyl glycol adipate, MW 1000).

TABLE 14

Hardness: Effect of Molecular Weight of the Polyester Polyol Component of PUD

| | Example No. | | | | | |
|---|---|---|---|---|---|---|
| | 39* | 40 | 41 | 42* | 43* | 44* | 45* |
| Ingredient | | | | | | | |
| Example A6 Polymer | X | X | X | | X | X | |
| Example B1 PUD | | X | X | X | | | |
| Example B10 PUD | | | | | X | X | X |
| Texanol ™ | X | X | X | | X | X | |
| % PUD | 0 | 20 | 50 | 100 | 20% | 50% | 100% |
| Pendulum Hardness (sec) | | | | | | | |
| 3 day dry | 24 | 67 | 62 | 49 | 28 | 42 | 66 |
| 7 day dry | 25 | 105 | 73 | 50 | 32 | 55 | 78 |
| 14 day dry | 25 | 119 | 76 | 48 | 32 | 60 | 78 |

*= comparative

In Table 14, blends employing 20% or 50% of a PUD (B1) comprising a polyether polyol of molecular weight 2000 result in pronounced early hardness development, i.e. the hardness of 20 Example 40 and 41 are significantly higher than both the constituent polymer (Example 39) and PUD (Example 42). Whereas, blends with 20% or 50% of B10 PUD comprising a polyester polyol of molecular weight 1000 fail to produce early hardness development, i.e. the hardness of Example 43 and 44 are not higher than the constituent PUD (Example 45).

Examples 46-54

The early hardness development is dependent on soft phases in the film for mobility of the coalescent out of the film. The softness of the PUD is controlled by the molecular weight and amount of polyol in the PUD. Table 15, below, shows the effect on hardness of varying the amount of high molecular weight polyol in the PUD. The paints in Table 15, below, use the following copolymer and PUD compositions:

Example A4 Polymer=35.2 BA/56.6 MMA/5 AAEM/3.2 PEM;

Example B11 PUD: 31.7 DesW/60.1 Fomrez 44-57/6.1 DMPA/2.1 EDA (NMP), (% polyol of Mw 2000=60.1%);

Example B12 PUD: 32.9 DesW/50.9 Fomrez 44-57/8.0 Fomrez 44-111/6.0 DMPA/2.2 EDA (NMP), (% polyol of Mw 2000=50.9%);

Example B 13 PUD: 37.9 DesW/44.0 Fomrez 44-57/7.5 Fomrez 44-111/8.1 DMPA/2.4 EDA (NMP), (% polyol of Mw 2000=44%);

Example B14 PUD: 44.1 DesW/37.8 Fomrez 44-57/6.6 Fomrez 44-111/7.8 DMPA/3.7 EDA (NMP), (% polyol of Mw 2000=37.8%);

Where Fomrez 44-57 is a polyester polyol (butanediol adipate) of molecular weight 2000 and Fomrez 44-111 is a polyester polyol (butanediol adipate) of molecular weight 1000.

TABLE 15

Hardness: Effect of Amount of High Molecular Weight Polyol Component in the PUD

| | Example No. | | | | | | | | |
|---|---|---|---|---|---|---|---|---|---|
| | 46* | 47 | 48 | 49 | 50* | 51* | 52* | 53* | 54* |
| Ingredient | | | | | | | | | |
| Example A4 Polymer | X | X | X | X | X | | | | |
| Example B11 PUD (60.1% polyol) | | X | | | | X | | | |
| Example B12 PUD (58.9% polyol) | | | X | | | | X | | |
| Example B13 PUD (51.5% polyol) | | | | X | | | | X | |
| Example B14 PUD (44.4% polyol) | | | | | X | | | | X |
| Texanol ™ | X | X | X | X | X | | | | |
| % PUD | 0 | 30 | 30 | 30 | 30 | 100 | 100 | 100 | 100 |
| Pendulum Hardness (sec) | | | | | | | | | |
| 1 day dry | 17 | 29 | 27 | 27 | 22 | 53 | 57 | 88 | 115 |
| 7 day dry | 18 | 74 | 64 | 65 | 36 | 55 | 60 | 94 | 139 |
| 24 day dry | 20 | 105 | 106 | 101 | 43 | 56 | 62 | 101 | 144 |

*= comparative

The invention claimed is:

1. An aqueous composition comprising a coalescent and a stable aqueous dispersion of a soft polyurethane and a hard polymer; wherein the hard polymer has a $T_g$ of at least 30° C. and the soft polyurethane has a $T_g$ in the range of 0 to −100° C.;
   wherein the soft polyurethane comprises at least 40% by weight of: a) units of a polyether polyol having a weight average molecular weight of from 1000 to 3000 Daltons and/or b) units of a polyester polyol, a polycaprolactam polyol, or a polycarbonate polyol, or a combination thereof having a weight average molecular weight of from 1500 to 3000 Daltons;
   wherein the solids weight percent of the hard polymer is from 65% to 85%; and the solids weight percent of the soft polyurethane is from 35 to 15%, each based on the solid weight of the hard polymer and the soft polyurethane
   wherein the coalescent has a boiling point in the range of 150° C. to 300° C. and is present in the composition at 4 to 25 weight percent based on the weight of the hard and soft polymers.

2. The aqueous composition of claim 1 wherein the hard polymer is an acrylic copolymer, a styrene-acrylic copolymer, or a vinyl-acrylic copolymer.

3. The aqueous composition of claim 2 wherein the units of the polyether polyol are units of polytetramethylene ether glycol having a weight average molecular weight of from 1000 to 3000 Daltons; wherein the solids weight percent of the hard polymer is from 70% to 80%; and the solids weight percent of the soft polyurethane is from 30% to 20%, each based on the solid weight of the hard polymer and the soft polyurethane.

4. The aqueous composition of claim 2 which comprises units of a polyester polyol having a weight average molecular weight of from 1500 to 2000 Daltons;
   wherein the solids weight percent of the hard polymer is from 70% to 80%; and the solids weight percent of the soft polyurethane is from 30% to 20%, each based on the solid weight of the hard polymer and the soft polyurethane.

5. The aqueous composition of claim 1, which, when applied as a coating to a substrate, loses water by evaporation to produce a film that exhibits a König pendulum hardness of at least 50 seconds as measured within 14 days after application of the coating to the substrate when the coated substrate is maintained at ambient conditions for the duration of the 14 days.

6. The aqueous composition of claim 1 which, when applied as a coating to a substrate, loses water by evaporation to form a film comprising a continuous pathway of the soft polyurethane interpenetrating the hard polymer, wherein the film exhibits a König pendulum hardness of at least 50 seconds as measured within 14 days after application of the coating to the substrate when the coated substrate is maintained at ambient conditions for the duration of the 14 days.

7. The aqueous composition of claim 1 wherein the hard polymer comprises, as polymerized units, one or more autooxidizable acetoactetoxy group.

8. The aqueous composition according to claim 1, wherein the coalescent is selected from the group consisting of diacid esters, phosphate esters, isobutyrate esters, alkyl esters of fatty acids, fatty ethers, fatty glycerides, fatty acid amides, alkoxylates of fatty acids, addition (co)polymer coalescents, and mixtures thereof.

* * * * *